(12) United States Patent
Blessing et al.

(10) Patent No.: US 10,358,011 B2
(45) Date of Patent: Jul. 23, 2019

(54) DYNAMIC WEIGHT SHIFT SUSPENSION SYSTEM

(71) Applicant: DANA HEAVY VEHICLE SYSTEMS GROUP, LLC, Maumee, OH (US)

(72) Inventors: Christopher D. Blessing, Toledo, OH (US); Christopher P. Lewark, Grand Rapids, OH (US); Jason M. Sidders, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 67 days.

(21) Appl. No.: 15/533,056

(22) PCT Filed: Dec. 11, 2015

(86) PCT No.: PCT/US2015/065146
§ 371 (c)(1),
(2) Date: Jun. 5, 2017

(87) PCT Pub. No.: WO2016/094746
PCT Pub. Date: Jun. 16, 2016

(65) Prior Publication Data
US 2017/0361675 A1  Dec. 21, 2017

Related U.S. Application Data

(60) Provisional application No. 62/090,903, filed on Dec. 12, 2014.

(51) Int. Cl.
*B60G 5/00* (2006.01)
*B60G 17/015* (2006.01)
(Continued)

(52) U.S. Cl.
CPC ........... *B60G 17/0525* (2013.01); *B60G 5/00* (2013.01); *B60G 17/018* (2013.01);
(Continued)

(58) Field of Classification Search
CPC ........... B60G 17/0155; B60G 17/0164; B60G 17/018; B60G 17/0525; B60G 17/0528;
(Continued)

(56) References Cited

U.S. PATENT DOCUMENTS 2,864,454 A  12/1958  LaBelle
4,141,430 A * 2/1979  Eddy, Jr. ............ B60G 17/0155
                                                  180/24.02
(Continued)

FOREIGN PATENT DOCUMENTS

CA   2845749 A1   9/2014
EP   2199123 A1   6/2010
(Continued)

OTHER PUBLICATIONS

European Patent Office, International Search Report with Written Opinion issued in PCT/US2015/065146, dated Mar. 11, 2016, 11 pages, European Patent Office, Rijswijk, Netherlands.

*Primary Examiner* — Laura Freedman
(74) *Attorney, Agent, or Firm* — Marshall & Melhorn, LLC

(57) ABSTRACT

A dynamic weight shift suspension system for shifting the tandem axle loads on a vehicle. The system includes a first airbag connected between the drive axle of a tandem and the vehicle frame, and a second airbag connected between a tag axle of a tandem and the vehicle frame. The system also has a mechatronic control unit comprising at least one port and at least one solenoid. The mechatronic control unit is in direct fluid communication with the airbags and an air supply via fluid communication lines.

13 Claims, 8 Drawing Sheets

(51) Int. Cl.
*B60G 17/016* (2006.01)
*B60G 17/018* (2006.01)
*B60G 17/052* (2006.01)

(52) U.S. Cl.
CPC ..... *B60G 17/0155* (2013.01); *B60G 17/0164* (2013.01); *B60G 17/0528* (2013.01); *B60G 2200/422* (2013.01); *B60G 2202/152* (2013.01); *B60G 2204/62* (2013.01); *B60G 2206/0116* (2013.01); *B60G 2300/0262* (2013.01); *B60G 2400/252* (2013.01); *B60G 2400/30* (2013.01); *B60G 2400/51222* (2013.01); *B60G 2500/204* (2013.01); *B60G 2500/2012* (2013.01); *B60G 2500/2021* (2013.01); *B60G 2800/182* (2013.01); *B60G 2800/214* (2013.01); *B60G 2800/915* (2013.01)

(58) Field of Classification Search
CPC .............. B60G 5/00; B60G 2500/2012; B60G 2500/2021; B60G 2500/204; B60G 2500/30; B60G 2400/252; B60G 2400/30; B60G 2400/51222; B60G 2800/182; B60G 2800/214; B60G 2800/915; B60G 2300/0262; B60G 2206/0116; B60G 2204/62; B60G 2202/152; B60G 2200/422

See application file for complete search history.

(56) References Cited

U.S. PATENT DOCUMENTS

| | | |
|---|---|---|
| 4,993,729 A | 2/1991 | Payne |
| 5,025,877 A * | 6/1991 | Assh .................. B60G 17/0155 180/209 |
| 5,193,063 A * | 3/1993 | Assh .................. B60G 17/0155 180/209 |
| 5,472,227 A | 12/1995 | Schoenfeld et al. |
| 5,884,998 A | 3/1999 | Silbernagel |
| 5,954,429 A | 9/1999 | Silbernagel |
| 6,123,444 A | 9/2000 | Silbernagel |
| 6,152,457 A | 11/2000 | Silbernagel |
| 6,308,793 B1 | 10/2001 | Eberling |
| 6,371,227 B2 | 4/2002 | Bartlett |
| 6,523,625 B2 * | 2/2003 | Eberling ............ B60G 17/0155 180/24.02 |
| 6,808,035 B1 * | 10/2004 | Keeler ..................... B60G 7/02 180/197 |
| 7,101,075 B2 | 9/2006 | Silbernagel |
| 7,850,195 B2 * | 12/2010 | Simard .................. B60G 5/047 280/678 |
| 7,959,173 B1 * | 6/2011 | Morroney ............ B60G 17/056 280/124.157 |
| 8,720,938 B2 | 5/2014 | Ehrlich |
| 8,955,858 B2 * | 2/2015 | Koontz .............. B60G 17/0526 280/124.11 |
| 9,346,332 B2 * | 5/2016 | Remboski ................ B60G 5/00 |
| 9,387,742 B2 * | 7/2016 | Van Raaphorst .... B60G 17/052 |
| 9,533,540 B2 * | 1/2017 | Lindsay ................ B60T 13/662 |
| 10,046,814 B2 * | 8/2018 | Siuchta ................ B62D 53/068 |
| 2002/0066605 A1 | 6/2002 | McClelland et al. |
| 2002/0163142 A1 | 11/2002 | Silbernagel |
| 2004/0036236 A1 | 2/2004 | Silbernagel |
| 2005/0029793 A1 | 2/2005 | Silbernagel |
| 2015/0329099 A1 | 11/2015 | Zawacki et al. |

FOREIGN PATENT DOCUMENTS

| | | |
|---|---|---|
| JP | H08300929 A | 11/1996 |
| JP | H09109645 A | 4/1997 |
| WO | 00/00360 A1 | 1/2000 |
| WO | 2006/054940 A1 | 5/2006 |

\* cited by examiner

| | Drive | | |
|---|---|---|---|
| Equal Loading | Height (in) | Pressure (psi) | Load on Airbag (lb) |
| | 14.5 | 64.26 | 4471.15 |
| | Tag | | |
| | Height (in) | Pressure (psi) | Load on Airbag (lb) |
| | 14.5 | 64.26 | 4471.15 |

| Drive GAWR= | 15000lb |
|---|---|
| Tag GAWR= | 15000lb |
| Tandem GAWR= | 30000 lb |

| | Drive | | |
|---|---|---|---|
| Unequal Loading | Height (in) | Pressure (psi) | Load on Airbag (lb) |
| | 14.5 | 80.00 | 5750.00 |
| | Tag | | |
| | Height (in) | Pressure (psi) | Load on Airbag (lb) |
| | 14.5 | 64.26 | 31.92.25 |

| Drive GAWR= | 19290 lb |
|---|---|
| Tag GAWR= | 10710 lb |
| Tandem GAWR= | 30000 lb |
| Percent Error | 0.00% |

FIG. 5

| Ports | Mode | Normal | Tractive |
|---|---|---|---|
| 32 | S1 | OFF | ON |
| 34 | S2 | ON | ON |
| 36 | S3 | ON | OFF |
| 38 | S4 | OFF | ON |
| 40 | S5 | ON | ON |

FIG. 6

| Inflate load shift test | | | | |
|---|---|---|---|---|
| | Drive load (lbs) | Tag load (lbs) | Total load shifted across axles (lbs) | Event time (sec.) |
| static | 8700 | 8300 | 400 | N/A |
| test 1 | 9100 | 8100 | 1200 | 2.4 |
| test 2 | 9600 | 7500 | 3400 | 6.5 |

FIG. 7

DYNAMIC WEIGHT SHIFT SUSPENSION SYSTEM

RELATED APPLICATION

This application claims priority to and benefit from U.S. patent application Ser. No. 62/090,903 filed on Dec. 12, 2014 which is currently pending and fully incorporated by reference herein.

FIELD OF THE INVENTION

The present invention relates to an air shift suspension system for use with the tandem axles of a commercial vehicle line haul tractor.

BACKGROUND OF THE INVENTION

The typical North American Class 8 Line Haul Truck uses a 6×4 tractor with two drive axles in the tractor rear tandem. A 6×2 drive line has a single drive axle and a dead tag axle in the rear tandem. The 6×2 system is lighter and has a lower parasitic loss compared to the 6×4 system, but suffers from a deficiency in tractive effort under conditions of reduced tire to ground coefficient since the drive axle and tag axle will have the same load.

Systems have been offered to increase the 6×2 single drive axle tractive effort such as wheel differential locks and service brake based electronic traction control systems. Additionally, 6×2 air suspension systems are available that can automatically shift load from the tag axle to the drive axle under conditions of low traction to improve the tractive effort of the drive axle but these systems are slow acting, costly and cumbersome.

In view of the foregoing disadvantages of the prior art, it would be advantageous to have a low cost system that is fast acting, cost effective and easy to incorporate that can safely and effectively improve the 6×2 drive axle traction.

SUMMARY OF THE INVENTION

The present invention is directed toward a system for shifting the tandem axle loads on a vehicle. Specifically the system shifts the weight from the tag axle to the drive axle and vice versa. The system includes a first airbag connected between the drive axle of a tandem and the vehicle frame, and a second airbag connected between a tag axle of a tandem and the vehicle frame. The system also has a mechatronic control unit comprising at least one port and at least one solenoid. The mechatronic control unit is in direct fluid communication with the airbags and an air supply via fluid communication lines.

In accordance with the present invention, it has been discovered that the ability to rapidly shift load weight to the drive axle during a traction event, while maintaining the same ride height of both axles is highly desirable.

BRIEF DESCRIPTION OF THE DRAWING

The above, as well as other advantages of the present invention, will become readily apparent to those skilled in the art from the following detailed description when considered in the light of the accompanying drawings in which:

FIG. 5 is a chart illustrating exemplary data of airbag pressures and axle loads under different loading conditions according to the present invention;

FIG. 6 is a chart illustrating solenoid positions for operating conditions according to the present invention;

FIG. 7 is a chart illustrating exemplary data results for load test conditions according to the present invention;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
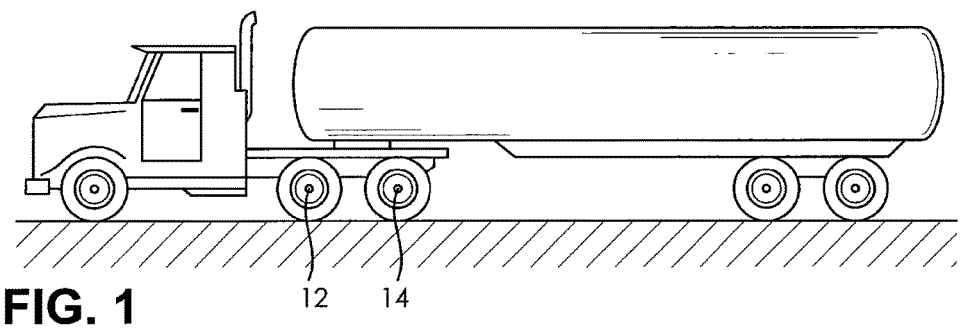
FIG. 1 is a side view of a commercial vehicle embodying the present invention.
Figure 2:
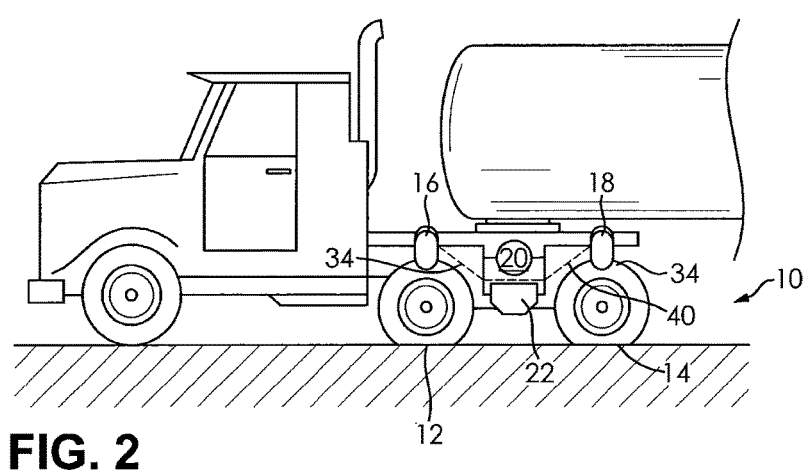
FIG. 2 is a detailed side view of a commercial vehicle embodying the present invention.
Figure 3A:
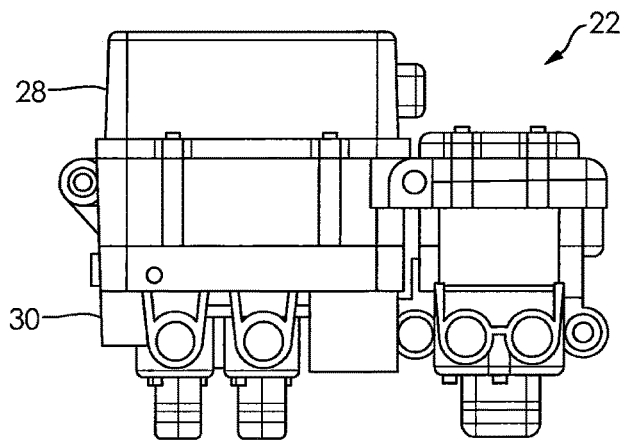
FIGS. 3A-3E are detailed views of one embodiment of a feature according to the present invention.
Figure 3B:
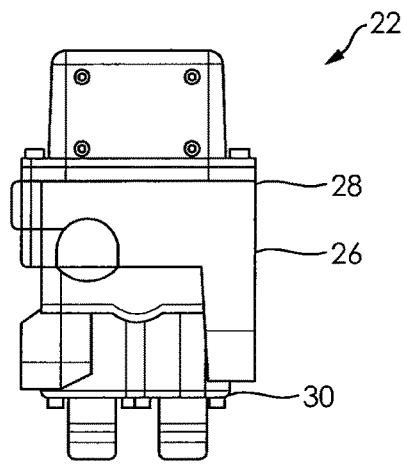
Figure 3C:
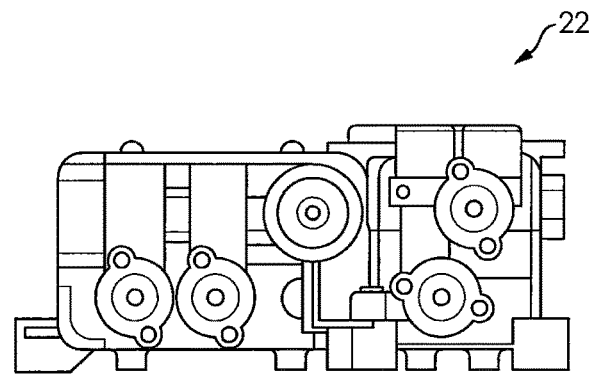
Figure 3D:
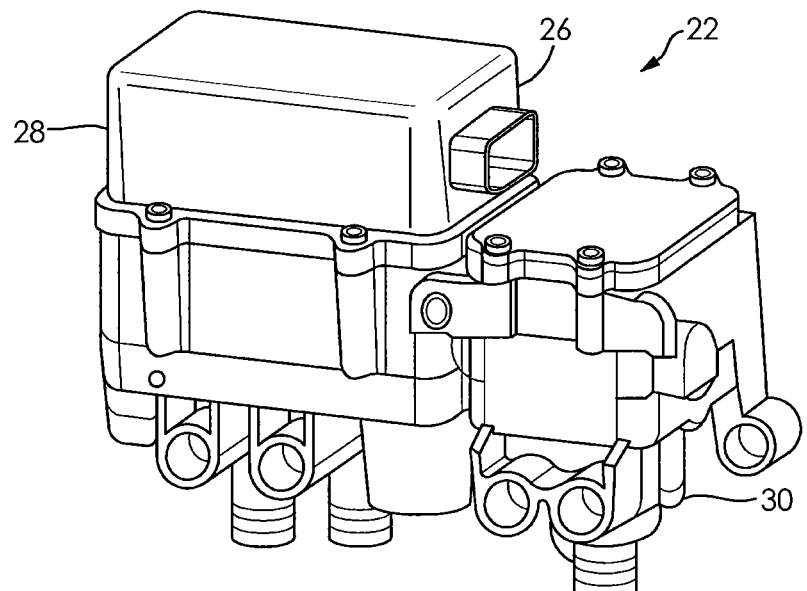
Figure 3E:
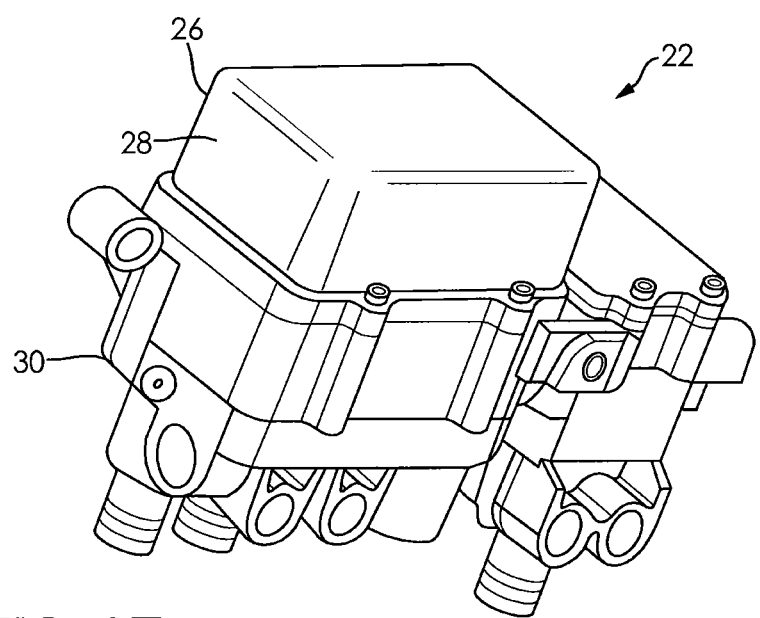

FIGS. 1 and 2 depict a weight shift suspension system 10 for a 6×2 vehicle having a single drive axle 12, a single tag axle 14, airbags associated with each axle 16, 18, an air supply tank 20, and a mechatronic control unit (MCU) 22 to control the flow of air between the airbags 16, 18, and the air supply tank 20.

The MCU 22 can facilitate in the accurate control of pressure for the system. As shown in FIGS. 3A-3E, the MCU comprises an electronic control portion 28 and a pneumatic control portion 30. The electronic control portion 28 is configured to determine the airbag 16, 18 pressures on the drive axle 12 and the tag axle 14 and, if needed, the electronic control portion 28 can control inflating and/or deflating the airbags 16, 18 thereof.

Various inputs to an MCU can be incorporated by using an algorithm to improve the functionality of the load shift algorithm. The algorithm may control the shifting of air pressure based on the vehicle parameters. The general concept is to try to predict when added tractive effort is needed and to then allow a weight shift for more traction. The estimated weight may cause the algorithm to limit or increase the pressure shifts.

The MCU 22 comprises a housing 26. The electronic control portion 28 and the pneumatic control portion 30 are provided within the housing 26. Preferably, the electronic control portion 28 is provided in an upper portion of the housing 26, and the pneumatic control portion 30 is provided in a lower portion of the housing 26.

The electronic control portion 28 may include a microprocessor operating under the control of a set of programming instructions, which may also be referred to as software. The electronic control portion 28 may include a memory (not depicted) in which programming instructions are stored. The memory can also store identification codes, airbag pressure records and/or user inputs over a period of time.

The electronic control portion 28 may receive input signals from a power supply (not shown) and/or one or more solenoids associated with the power supply. The solenoids may be conventional in the art. The electronic control portion 28 may also receive input signals from an operator control device (not shown). The operator control device may allow an operator of the vehicle to exert a certain level of control over the weight shift suspension system 10. The operator control device may be conventional in the art.

The electronic control portion 28 can output signals to one or more ports and/or passages in the pneumatic control portion 30. Preferably, the electronic control portion 28 outputs signals to a plurality of ports and/or passages via a solenoid associated with each. As depicted in the schematic on FIG. 4, there is a supply port 32 with its respective solenoid S1 which provides pressurized air to the system. A deflate port 38 with its respective solenoid S4, which removes pressurized air from the system and vents it back out into the atmosphere. A drive axle port 34, with its respective solenoid S2, is in direct fluid communication with the drive axle airbag 16. A tag axle port 40, with its respective solenoid S5, is in direct fluid communication with the tag axle airbag 18. An open/close control passage 36, with its respective solenoid S3, acts as a coordinator between the drive axle airbag 16 and the tag axle airbag 18 and the supply port 32 and the deflate port 38. A control line C facilitates the communication of the open/close control passage 36 with the ports 32, 34, 38, 40.

The output signals may be electrical current. While solenoids are described in this invention, other types of devices capable of receiving an electrical signal are also within the scope of the invention. Electrical current can be received by a solenoid to place the respective port or passage into an open position or a closed position. Similarly, electrical current can be removed from the solenoid to place the respective port or passage into in an open position or a closed position. The electronic control portion 28 may also output signals to a display device (not depicted). The display device may be included as a part of the operator control device or a freestanding device. As depicted in FIGS. 3A-3E, the pneumatic control portion 30 comprises one or more ports and/or passages provided within the housing 26 and one or more ports formed in the housing 26.

Figure 4:
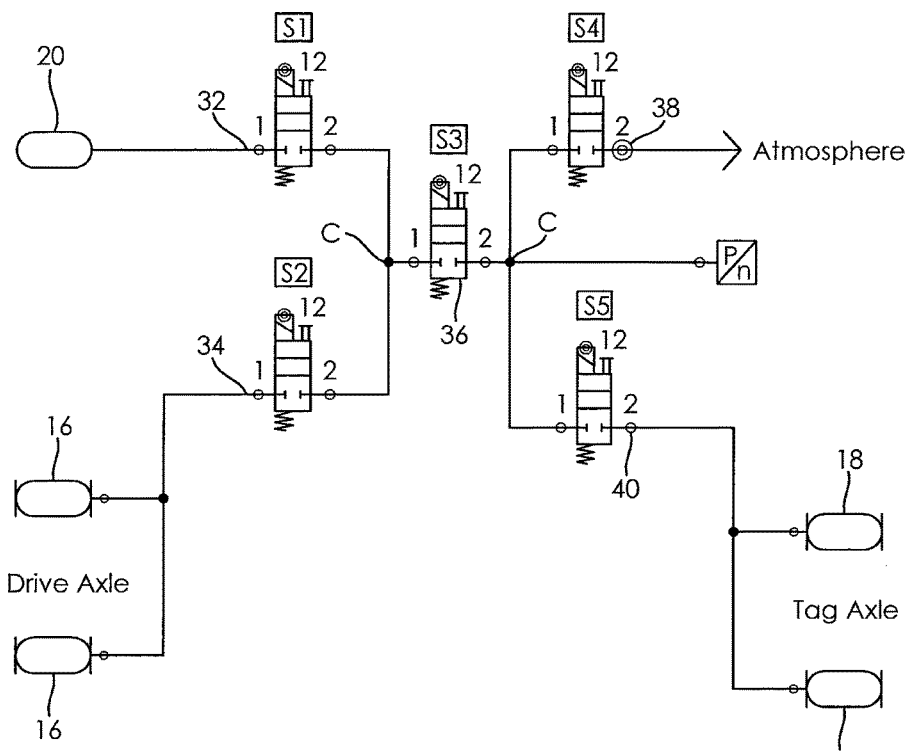
FIG. 4 is a schematic view of an embodiment of a weight shift suspension system according to the present invention.

In the schematic depicted in FIG. 4, the MCU 22 comprises four ports 32, 34, 38, 40 and an open/close control passage 36, but it is understood that the MCU 22 may comprise more or less ports and/or passages. The control line C within the MCU 22 is in fluid communication with each of the ports 32, 34, 38, 40 and the open/close control passage 36, and as previously noted, each comprises a separate solenoid (S1-S5) to isolate and open or close the respective port or passage. The control line C can separate the MCU 22 into two sides. A first side comprises the supply port 32 and the drive axle port 34. A second opposite side comprises the deflate port 38 and the tag axle port 40.

The control solenoid S3 is in direct communication with each of the other solenoids S1, S2, S4, S5 and a pressure transducer, Pn. The pressure transducer Pn is a sensor capable of monitoring a fluid pressure within the control line C. The pressure transducer Pn may also be configured to communicate a signal, relaying information about the fluid pressure within the control line C to a controller (not shown). Consistent with the previously discussed arrangement, the control line C is in direct fluid communication with each of the ports 32, 34, 38, 40 and the open/close control passage 36.

The weight shift suspension system 10 also includes a source of pressurized air. Pressurized air is supplied to the supply port 32 from the air supply tank 20. The air supply tank 20 provides a source of pressurized air, via fluid communication lines to the supply port 32 of the MCU 22 and into the airbags 16, 18.

The MCU 22 is used to regulate air to a particular location via fluid communication lines. The fluid communication lines may be of any diameter as is sufficient for the application. In the present invention, the drive axle port 34 of the MCU 22 is connected to the drive axle airbags 16, and the tag axle port 40 of the MCU 22 is connected to the tag axle airbags 18. More specifically, the drive axle port 34 and the tag axle port 40 are connected through the open/close control passage 36 to allow the transfer of air between the drive axle airbags 16 and the tag axle airbags 18.

The deflate port 38 of the MCU 22 can be used to evacuate air from the drive axle airbags 16 and/or the tag axle airbags 18 into the atmosphere. One or both of the airbags 16, 18 can be selectively evacuated to return them to their original pressure or if an emergency deflation is required.

Air moving through the supply port 32 is in direct communication with open/close control passage 36 and the drive axle port 34, and air moving through the open/close control passage 36 is also in direct communication with the tag axle port 40 and the deflate port 38. The open/close control passage 36 is a connection between the ports 32, 34, 38, 40 to facilitate the flow of air from the air supply tank 20 to the drive and/or tag axle airbags 16, 18, or the flow of air can also be reversed to draw air from the airbags 16, 18 evacuating the air into the atmosphere through the deflate port 38.

The drive axle airbags 16 and the tag axle airbags 18 as depicted in the figures are the same, meaning the same height and diameter. However, it is also within the scope of the invention for the airbags to be of different sizes, meaning the drive axle airbag may have a diameter and/or height that is different from the tag axle airbag. Whatever size airbags are used on the drive axle 12 and the tag axle 14, it is important to control and maintain an acceptable truck ride height.

Ride height is measured from the center of the axle to the bottom of the frame rail of a vehicle. Vehicles equipped with rear air suspensions have their ride height and axle pinion angles preset at the factory. These are precision settings and should not be altered. Incorrectly or improperly adjusted ride height may result in premature driveline wear and driveline vibration. For example, when a larger ground load is needed on the drive axle 12 due to a traction event, such as during wet and/or other types of slippery, muddy or snowy conditions, pressurized air needs to be rapidly and efficiently transferred to increase the pressure in the drive axle airbags. While doing this, it is important that the vehicle ride height be maintained at or near the desired distance.

In one example using exemplary data under normal conditions as depicted on FIG. 5, both the drive axle and tag axle airbags 16, 18 have the same internal air pressure at the standard ride height under equal axle loading conditions. As shown, the airbag 16, 18 on each axle with carry a load of 4471.15 lbs. Consequently under normal operation mode and equal loading the air pressure in each airbag 16, 18 is substantially equal and the ride height in both axles will be the same. The tire tractive effort distribution is equal in both the drive axle 12 and the tag axle 14. These numbers are reflective of level ground conditions under normal operation mode. In this condition as depicted in FIG. 6, the solenoid configurations for the supply port 32 and the deflate port 38 are both off and drive axle port 34, the open/close control passage 36, and the tag axle port 40 are all on.

If a traction event is sensed, the MCU 22 can rapidly transfer air from the air supply tank 20 to the drive axle airbags 16 while simultaneously drawing air out of the tag axle airbags 18, if needed. Under tractive mode, air pressure in the drive axle airbags 16 is typically increased and air pressure in the tag axle airbags 18 is decreased. As shown in FIG. 5 under unequal loading, the airbag on the drive axle will carry a load of 5750 lbs. and the airbag on the tag axle will carry a load of 3192.25 lbs. The added pressure in the drive axle airbags 16 combined with the reduced pressure in the tag axle airbags 18 results in a higher drive axle 12 ground load and a lower tag axle 14 ground load at approximately the same ride height. In this condition as depicted in FIG. 6, the solenoid configuration for the open/close control passage 36 is off and the supply port 32, drive axle port 34, the deflate port 38 and the tag axle port 40 are all on.

After the added tractive effort is applied and the wheel slip is reduced or eliminated, the MCU 22 will return to the normal state and the air pressure in the airbags 16, 18 is adjusted back to their respective air pressures prior to the tractive event.

While returning to the normal state, typically one airbag increases pressure while the other airbag decreases pressure. The decrease in air pressure from the drive axle airbags 16 can be achieved by transferring air through the open/close control passage 36 and to either the tag axle port 40 back in to the tag axle airbags 18 or through the open/close control passage 36 to the deflate port 38 and out into the atmosphere.

Fluid communication lines are most commonly used for connecting the MCU 22 to the airbags 16, 18. The drive axle and tag axle airbags 16, 18 and the MCU 22 are typically in close proximity, so the air transfer through the fluid communication lines can be very quick. Typically, there is an air compressor (not shown) on all commercial trucks to operate the air brake and air suspension systems. The air compressor includes an air tank but the weight shift suspension system could have its own reservoir close to the axles so that air is quickly available and does not need to be robbed from the brakes. While tractive capability is needed for moving forward, it may also be needed for improved braking and stopping.

As previously noted, the ability to rapidly transfer shift load weight during a traction event is a desirable feature of a weight shift suspension system. FIG. 7 details exemplary data of two different tests in shifting load weight from the tag axle 14 to the drive axle 12. In the first test 1200 lbs. is shifted in only 2.4 seconds, and in the second test 3400 lbs. is shifted in 6.5 seconds. FIGS. 8-11 further illustrate exemplary data of different examples of load shift tests and the respective results.

Figure 8:
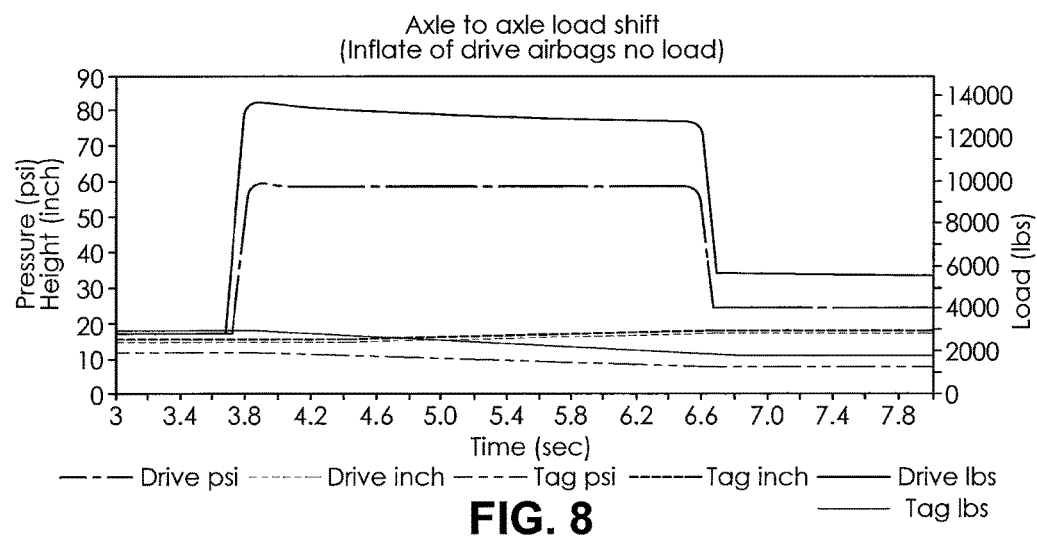
FIG. 8 is a graph illustrating exemplary data of axle to axle load shift to inflate drive axle airbags according to an embodiment of the present invention.

The graph in FIG. 8 illustrates exemplary data of an axle to axle load shift and the time elapsed in inflating the drive axle airbags from 12 psi to 24 psi and from a load of 3000 lbs. to about 5500 lbs. Concurrently the tag axle airbags psi and lbs. remain relatively the same with only a minor decrease in both.

Figure 9:
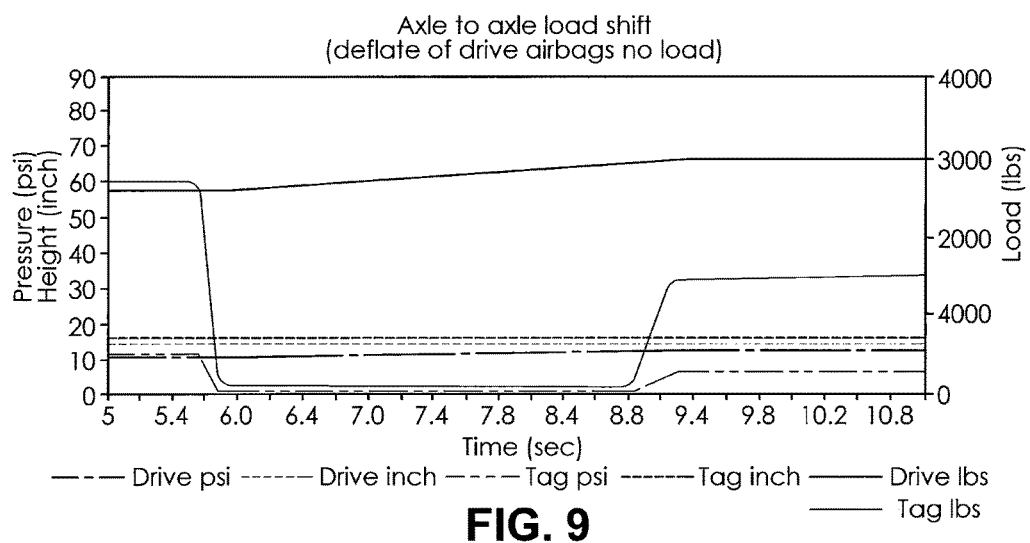
FIG. 9 is a graph illustrating exemplary data of axle to axle load shift to deflate tag axle airbags according to an embodiment of the present invention.

The graph in FIG. 9 illustrates exemplary data of an axle to axle load shift and the time elapsed in deflating the tag axle airbags from 10 psi to 5 psi and from a load of about 2500 lbs. to 1500 lbs. Concurrently the drive axle airbags psi and lbs. remain relatively the same with only a minor increase in the drive lbs.

Figure 10:
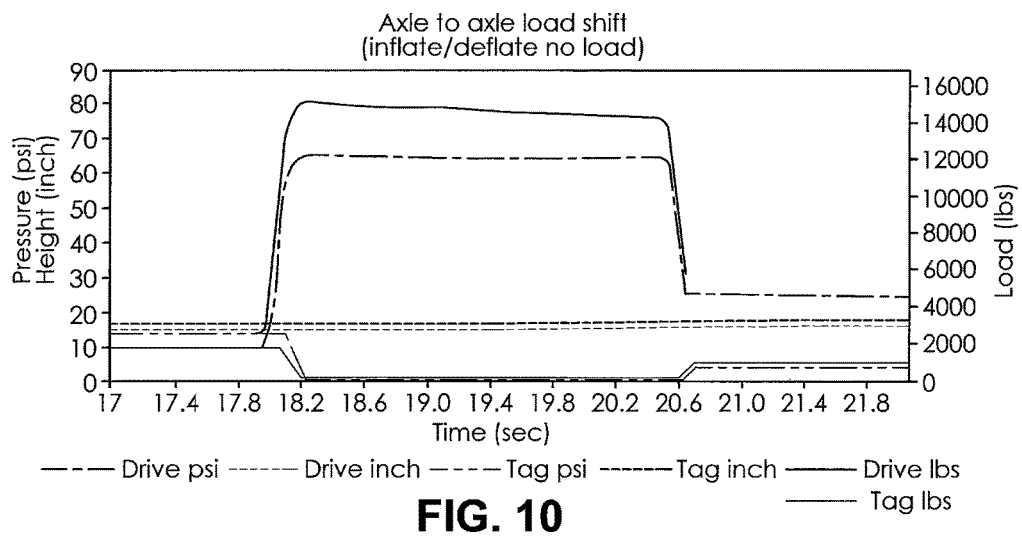
FIG. 10 is a graph illustrating exemplary data of axle to axle load shift to inflate drive axle airbags and simultaneously deflate tag axle airbags according to an embodiment of the present invention.

The graph in FIG. 10 illustrates an axle to axle load shift and the time elapsed in inflating the drive axle airbags while simultaneously deflating the tag axle airbags. The drive axle airbags increase from 15 psi to about 25 psi and from a load of about 2500 lbs. to just 6000 lbs. While simultaneously the tag axle airbags decrease from 10 psi to 5 psi and from a load of about 3000 lbs. to about 1000 lbs.

Figure 11:
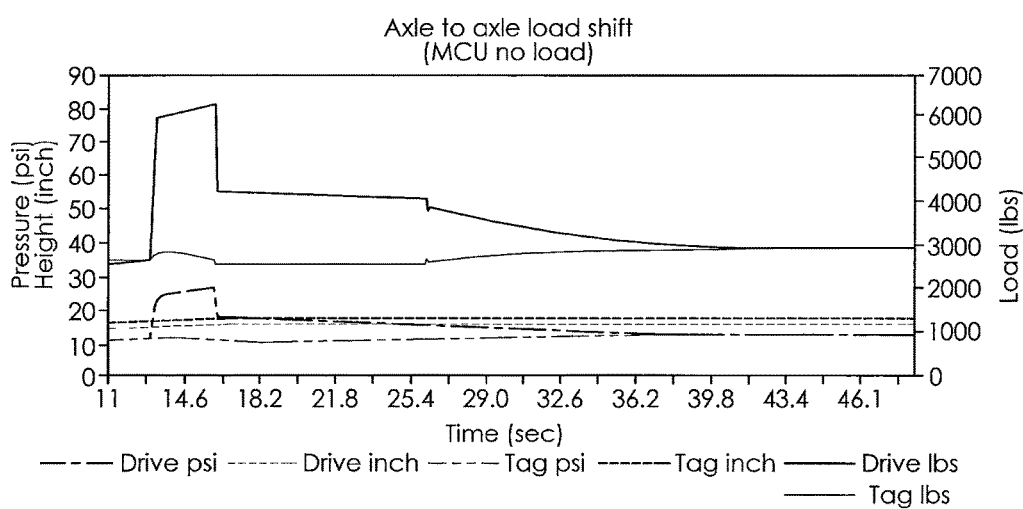
FIG. 11 is a graph illustrating exemplary data of axle to axle load shift according to an embodiment of the present invention.

The graph in FIG. 11 illustrates an axle to axle load shift and the time elapsed in inflating the drive axle airbags from 15 psi to about 20 psi and from a load of 2800 lbs. to about 4000 lbs. Concurrently the tag axle airbags psi and lbs. remain relatively the same with only a minor fluctuation in the tag axle lbs.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A dynamic weight shift suspension system, comprising:
   a first airbag connected between a drive axle of a tandem and a vehicle frame;
   a second airbag connected between a tag axle of said tandem and said vehicle frame; and
   a mechatronic control unit (MCU) in direct fluid communication with said first airbag, said second airbag and an air supply via fluid communication lines;
   wherein said mechatronic control unit comprises four ports and a control passage located within a pneumatic control portion of said mechatronic control unit, said ports comprise a supply port, a drive axle port, a deflate port, and a tag axle port;
   wherein each of said ports and said control passage comprises a respective solenoid, said solenoids receive a signal to open or close said respective port or said control passage; and
   wherein under a normal operation mode the solenoid configurations for said supply port and said deflate port are both off, and the solenoid configurations for said drive axle port, said control passage and said tag axle port are all on.

2. The dynamic weight shift suspension system of claim 1, wherein said first airbag and said second airbag are the same size.

3. The dynamic weight shift suspension system of claim 1, wherein said mechatronic control unit comprises a control line, said control line is in fluid communication with at least one of said ports, said control line separates said mechatronic control unit into two sides.

4. The dynamic weight shift suspension system of claim 3, wherein a first side of said mechatronic control unit comprises said supply port and said drive axle port, and wherein said second side of said mechatronic control unit comprises said deflate port and said tag axle port.

5. The dynamic weight shift suspension system of claim 1, wherein an air pressure in said first airbag is equal to an air pressure in said second airbag under equal loading conditions, and wherein a height of said first airbag and a height of said second airbag are equal.

6. The dynamic weight shift suspension system of claim 5, wherein under said equal loading conditions the load pounds on said first airbag is equal to the load pounds on said second airbag.

7. The dynamic weight shift suspension system of claim 1, wherein an air pressure in said first airbag is greater than an air, pressure in said second airbag under unequal loading conditions, and wherein a height of said first airbag and a height of said second airbag are equal.

8. The dynamic weight shift suspension system of claim 7, wherein under said unequal loading conditions the load pounds on said first airbag is greater than the load pounds on said second airbag.

9. The dynamic weight shift suspension system of claim 1, wherein said supply port is in direct fluid communication with said control passage and said drive axle port.

10. The dynamic weight shift suspension system of claim 1, wherein said deflate port is in direct fluid communication with said control passage and said tag axle port.

11. The dynamic weight shift suspension system of claim 1, wherein under a tractive operation mode pressurized air from an air supply tank is forced through said fluid communication lines and through said supply port, through said drive axle port and into said first airbag, while simultaneously pressurized air can be drawn out of said second airbag through said fluid communication lines and transferred through said tag axle port, through said control passage, through said drive axle port and into said first airbag.

12. The dynamic weight shift suspension system of claim 1, wherein upon return to said normal operation mode pressurized air is drawn out of said first airbag through fluid communication lines and through said drive axle port, through said control passage, through said deflate port and is expelled into the atmosphere, while simultaneously said pressurized air from said first airbag can be transferred via fluid communication lines and through said drive axle port, said control passage, said tag axle port and into said second airbag.

13. A dynamic weight shift suspension system, comprising:
a first airbag connected between a drive axle of a tandem and a vehicle frame;
a second airbag connected between a tag axle of said tandem and said vehicle frame; and
a mechatronic control unit (MCU) in direct fluid communication with said first airbag, said second airbag and an air supply via fluid communication lines;
wherein said mechatronic control unit comprises four ports and a control passage located within a pneumatic control portion of said mechatronic control unit, said ports comprises a supply port, a drive axle port, a deflate port, and a tag axle port;
wherein each of said ports and said control passage comprises a respective solenoid, said solenoids receive a signal to open or close said respective port or said control passage; and
wherein under a tractive operation mode the solenoid configuration for said control passage is off, and the solenoid configurations for said supply port, said drive axle port, said deflate port and said tag axle port are all on.

* * * * *

UNITED STATES PATENT AND TRADEMARK OFFICE
CERTIFICATE OF CORRECTION

PATENT NO. : 10,358,011 B2
APPLICATION NO. : 15/533056
DATED : July 23, 2019
INVENTOR(S) : Christopher D. Blessing, Christopher P. Lewark and Jason M. Sidders Page 1 of 1

It is certified that error appears in the above-identified patent and that said Letters Patent is hereby corrected as shown below:

In the Claims

Claim 7, Column 7, Line 9, delete the "," between the words "air" and "pressure"

Signed and Sealed this
Twenty-first Day of April, 2020

Andrei Iancu
*Director of the United States Patent and Trademark Office*